Feb. 15, 1927.
T. E. DAUGHERTY
1,617,671
SIGNAL FOR ROAD VEHICLES
Filed Jan. 26, 1923
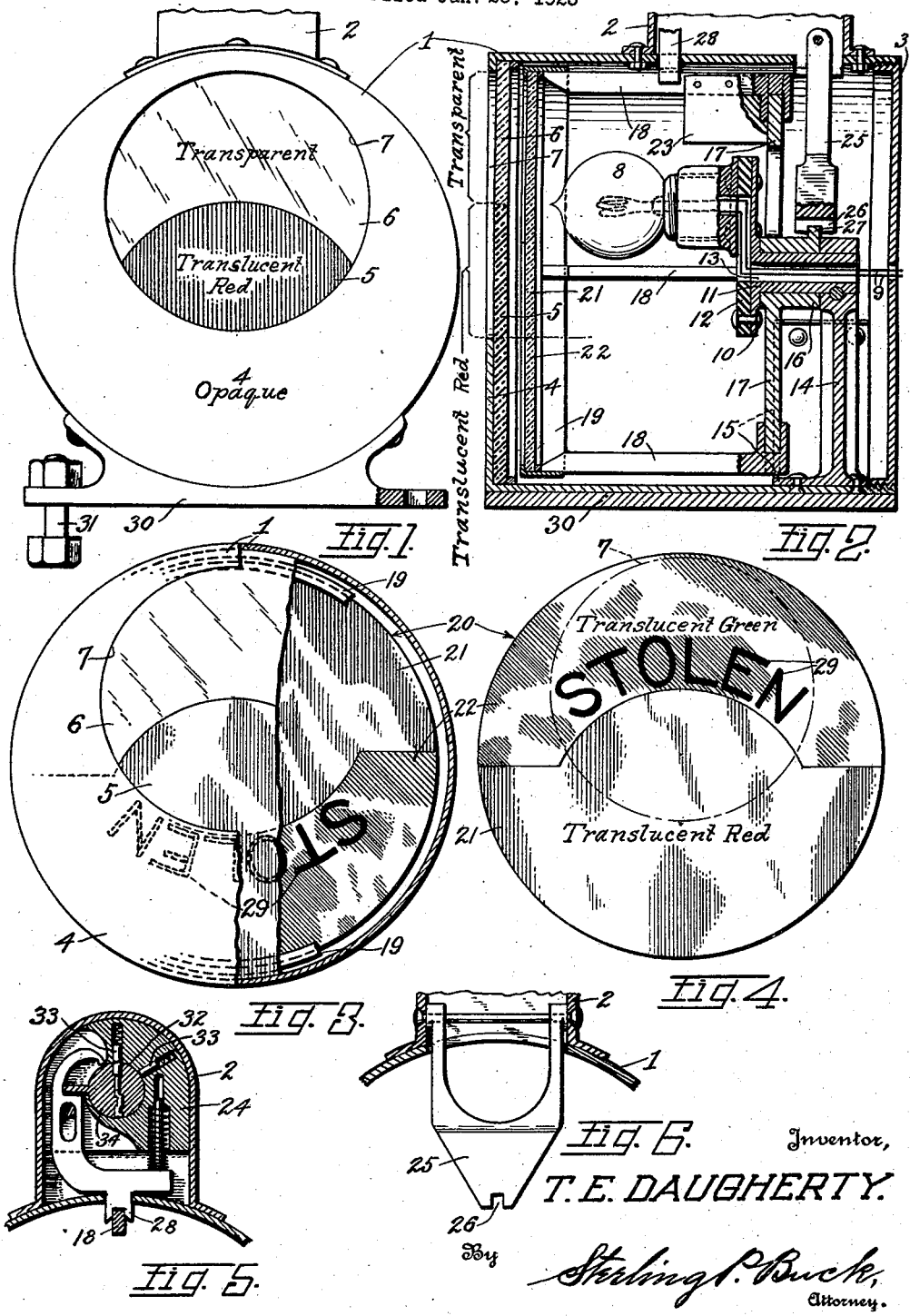
Inventor,
T. E. DAUGHERTY.

Patented Feb. 15, 1927.

1,617,671

UNITED STATES PATENT OFFICE.

THOMAS E. DAUGHERTY, OF BALTIMORE, MARYLAND.

SIGNAL FOR ROAD VEHICLES.

Application filed January 26, 1923. Serial No. 614,949.

This invention relates to signals for road-vehicles, especially a combination including a signal for indicating the position of the vehicle at night with respect to its front and rear ends, and a signal for indicating the status of the vehicle with respect to its possessor, owner or operator, also indicating the authority or lack of authority, of the latter, to operate or move the vehicle.

One object of this invention is to provide a unitary attachment for an automobile or other vehicle, such attachment to include the combination defined in the preceding paragraph.

A further object is to provide a device of this character which is formed of few and simple parts arranged compactly and co-operatively and including a normally closed casing in which all its working parts are inaccessible to a party or person not in possession of appropriate opening means which may be provided for and retained by the authorized operator or user of the vehicle.

A further object is to provide a device of this character which automatically operates, by traveling movement of the vehicle, whether driven by its own power or by an external power, provided it has been prepared to thus operate; but which can be kept locked or secured against such operation; and which, when it operates, changes from a mere position-indicator to a status-indicator such as defined in a previous paragraph.

It is a generally accepted fact that red lights known as "tail lights" are invariably secured on the rear ends of the vehicles that carry them, that they face rearwardly, so they can be seen from behind the vehicles, and can not be seen from in front of the vehicles; thus serving, in the dark, when the vehicle can not be seen, to indicate the position of the vehicle, with respect to its front and rear ends. Such is the case with the present device, it being secured on the vehicle with its face turned rearward so its red light in visible only from the rear; and when it is visible, it indicates that the rear (and not the front) end of the vehicle is turned towards the observer.

Other objects and desirable features will be pointed out or implied in the following details of description, in connection with the accompanying drawings in which:

Figure 1 is a face view or front view of the device having its upper part broken off and part of its bottom part in section.

Figure 2 is a central vertical sectional view.

Figure 3 is a detail view showing part of the face of the casing broken away, also part of the sign-carrying frame broken away, the base and lock being omitted.

Figure 4 is a detail showing the face of the translucent sign-plate detached.

Figure 5 is a sectional view of a lock such as may be employed to lock the signal in its two operative relations.

Figure 6 is a detail view showing the lower part of the lock-casing, the upper part of the sign-casing and the pendulum or secondary lock which holds the sign-frame in its normal position when the primary lock is unlocked.

The colors red and green are indicated in these drawings by parallel vertical and slanting lines, as prescribed in the Patent Office Rules of Practice. As no rules are prescribed for indicating the distinctions between transparent, translucent and opaque portions; they are here distinguished by the appropriate adjectives; and it is to be understood that these adjectives are not applied on the drawings as part of the invention; nor are they to appear on the device in actual practice, but are merely used here to elucidate the description. However, the word "Stolen", or any equivalent word or sign so arranged and operated in connection with the other elements, as described hereinafter, is an important feature of the invention.

The casing 1 may be cylindrical, as shown, or of any appropriate shape, and the lock-casing 2 may properly be considered a part of the signal-casing, although it is here shown as being removably secured on the casing 1 by bolts whose nuts are accessible only from the inside of the casing 1, the latter having its rear wall screwed into the hollow cylindrical end and there secured by solder, so that it can not be removed except by the employment of such means that would be inconvenient, tedious and likely to cause suspicion if employed outside of a shop or other suitable place. However, any other appropriate means may be employed for gaining access to the interior of the sign-casing and for resisting such access by an unauthorized person.

The front wall or face of the sign-casing consists of an opaque portion 4 (preferably metal and an integral part of the hollow cylinder), a translucent portion 5 (preferably heavy glass which is red or having a red inner surface) and a transparent portion 6 (preferably clear glass and formed integrally with the translucent portion). The opaque portion 4 has an opening 7 therethrough which combines with the plate 5—6 to form a closed window which prevents access to the interior of the casing, through its front side, but permits light to radiate from a lamp 8 through the parts of the glass 5—6 which are visible through the opening 7. The lamp 8 is preferably an electric lamp whose conducting wires 9 may extend through an opening of the casing 1 and connect with any appropriate source of electric energy (not shown), and any appropriate means (not shown) may be employed for shielding these wires and the opening through which they extend.

Any appropriate means may be employed for supporting the lamp 8, but as here shown, the lamp-socket is secured on a flange 10 of a hub or cylindrical bearing 11, and an insulating plate 12 may be secured between the socket and the flange, the hub 11 and plate 12 being provided with a passage 13 through which the lamp-conductors extend. The hub or bearing 11 is fixed to and supported by a standard or support 14 whose base 15 is riveted or otherwise united with the casing 1, and the upper end of this standard is in the form of a collar or abutment which combines with the flange 10 for preventing axial movement of a sign-frame whose hub 16 is journalled on the bearing 11 and carries a radial extension 17 which may be either in the form of a disc, a spider or a plurality of arms, but which combines with the hub 16, a plurality of horizontal arms 18 and a flanged ring 19, to form the sign-frame which carries a sign-plate such as shown detached in Fig. 4, this figure also showing the abnormal or theft-indicating position of the sign-plate, the position of the opening 7 being here indicated by the broken line circle. This disc or plate 20 is entirely translucent and non-transparent. It consists of a normally-upper red portion 21 and a normally-lower portion 22 which is here indicated as being green, but which may be any color other than that of the portion 21; for instance, if the public or the traffic regulations should adopt any special color or shade of coloring or combination of colors to indicate theft or unauthorized use of a vehicle, then the part 22 will of course be of such color, for the same reason that red is universally recognized and used to indicate danger; and for the latter reason, I have adopted red for the parts 5 and 21, although this is also subject to change without departure from my inventive ideas.

As shown in Figs. 1 and 2, the center of the opening 7 is preferably above the center of the cylindrical casing 1, also above the axis of the hub 16; and consequently, the widest part of the opaque portion 4 is below the axis of rotation of the sign-frame and the sign-plate. In other words, the opaque part is sufficiently large at its lower part to hide the translucent-green portion or theft-indication portion when in the normal position shown in Figs. 1, 2 and 3. On the other hand, the red part 21 is of such shape and area that it extends throughout the area of the opening 7 when in its position for indicating danger which results from the position of the vehicle, or which is likely to result by the stopping or slowing of the vehicle. Therefore the red portion 5 could be eliminated without changing the main principles of the invention, but is preferably employed, as shown, when it is desirable to present to view two shades of red. In Figs. 1 and 3 it is assumed that the lamp is not lighted, hence the red part 21 is not visible or only dimly visible through the transparent part 6.

The rotary frame is provided with a weight 23 which is normally on or near the center of gravity of the frame and tends to rotate or invert the frame and the sign-plate whenever the weight 23 is off of the center of gravity and whenever any side-motion of the weight occurs. However, a lock 24 (in the casing 2) (Fig 5) co-operates with a secondary lock or motion-operated lock 25 which is here shown as a pendulum, but the invention is not limited to this form of lock or detent. The lower part of the pendulum 25 is provided with a notch 26 which engages with opposite sides of a lug 27 of the hub 16 so that the hub can not rotate, even after the bolt 28 of the lock 24 is retracted out of engagement with the normally-upper arm 18 of the sign-frame, provided that the vehicle is not in traveling motion; but such traveling motion causes the pendulum 25 to swing and disengage the lug 27, and the weight 23 will then cause the sign-frame to invert the sign-plate from the position shown in Figs. 2 and 3 to the position shown in Fig. 4, thus bringing into view the color that indicates theft or unauthorized use of the vehicle. In addition to such color, I may employ any word or abbreviation or sign 29 for indicating the unauthorized use or theft of the vehicle, for instance, the word "Stolen" on the theft-indicating color.

A base 30 and securing bolts, one of the latter being shown at 31, may be provided for securing the device to any appropriate part of the vehicle or support on the vehicle, and these bolts may be riveted so the nuts can not be removed with a wrench (by unscrewing), or other means may be employed for securing the device to a vehicle. When the device is secured to the vehicle, its signal faces rearward; the signal-face being in a vertical plane extending transversely of the line of travel of the vehicle.

This device includes certain features and principles which are included in my theft-preventing device which is the subject matter of a patent-application filed by me Sept. 27th, 1921, Serial No. 503,579; and therefore, this device is to some extent an improvement upon that former invention. Among other similar features, attention is directed to the lock, Fig. 5 whose tumbler-seat 32 is provided with two sets of key-controlled plungers which lock the tumbler 34 in two positions, that is, in the position for holding the bolt 28 in the locking relation with the arm 18 and out of this locking relation. To those who are familiar with this well known class of locks, no further explanation seems necessary; for any appropriate form of lock may be employed in lieu of the one here shown.

*Operation.*

Every time the owner or authorized user of the vehicle leaves the vehicle beyond his watch-care, he first inserts a key in the cylinder 34 of the lock 24 and turns the key so as to disengage the bolt 28 from the sign-frame, at the same time bringing the key in alinement with the lower set of plungers 33, and on withdrawing the key, this set of plungers lock the cylinder 32 in position to hold the bolt 28 up out of engagement with the sign-frame. The secondary lock or pendulum 25 retains the sign-frame in its normal position, and unless the vehicle is caused to travel, the owner or rightful user, on returning, re-inserts the key and turns it for re-engaging the bolt 28 with the sign-casing; but if the vehicle is caused to travel at a velocity sufficient to vibrate the pendulum 25 (while the lock 24 is unlocked), the notch 26 will swing out of engagement with the lug 27 of the sign-frame, thus releasing the latter and permitting its weight 23 to invert it so as to show the theft-sign through the transparent part 6.

It is not intended to limit this invention to the exact construction and arrangement here shown and described, but changes may be made within the scope of the inventive ideas as implied and claimed.

What I claim as my invention is:—

1. In a signal for road-vehicles; the combination of a casing provided with means for attaching it to a road-vehicle, said casing including a window; a sign which is normally hidden within the casing and constitutes an evidence of unauthorized use when it is visible through said window; and normally locked means to control the hiding of said sign, said normally locked means being provided with means to hold it in its normal position when unlocked while the road-vehicle is at rest, and this normally locked means also being shiftable by a traveling movement of the road-vehicle and thereby effective for rendering said sign visible through said window; said window including a translucent portion, a part of said translucent portion being red for providing a tail-light, this tail light being effective when the automatically operable means is unlocked while the road-vehicle is at rest, means being provided to operate by traveling movement of the road-vehicle so as to change the signal from its function as a tail-light to its function of indicating unauthorized traveling movement of the road-vehicle.

2. The combined tail-light and theft-signal for road-vehicles, including a casing provided with means to secure it to a road-vehicle, the face of said casing having a window including a transparent portion, a lamp in said casing, and an automatically shiftable sign-member between said lamp and said window, said sign-member including two signs which are alternately visible through said window as the sign-member shifts, one of said signs including red for correlation with the lamp for providing the tail-light, the other sign including a color distinctly different from that of the tail-light-sign, this other sign also including a word or symbol to indicate unauthorized travel of the road-vehicle.

3. The combined tail-light and theft-signal for attachment to road-vehicles, including a casing having a window which includes a transparent portion, a lamp in said casing, an automatically shiftable sign-member in the casing and including two signs which are alternately visible through said window as the sign-member shifts, one of said signs including red for correlation with the lamp in providing the tail-light, the other sign including a color other than red and being of a character to indicate unauthorized use.

4. The structure defined by claim 3, and means to lock and unlock the sign-member to hold it against shifting, and permit it to be shifted by traveling movement of the road-vehicle when unlocked.

5. The structure defined by claim 3, means to lock the sign-member against shifting, and detaining means to prevent other than traveling movement of the road-vehicle from shifting the sign-member, said detaining means being operable by traveling movement for releasing said sign-member and permitting it to shift to the theft-signalling position.

6. The combined tail-light and theft-signal for road-vehicles including a casing attachable to a road-vehicle and including a transparent portion, a theft-sign in the casing, a tail-light-sign in the casing and including a red portion, means to illuminate these signs, and means to lock the signs in such position that the theft-sign is hidden while the tail-light-sign is visible through said transparent portion, said signs being automatically shiftable by motion of the vehicle when unlocked, so as to show the theft-sign through said transparent portion.

In testimony whereof I affix my signature.

THOMAS E. DAUGHERTY.